(12) United States Patent
Imai et al.

(10) Patent No.: US 7,023,662 B2
(45) Date of Patent: Apr. 4, 2006

(54) DISK CARTRIDGE

(75) Inventors: Fumihito Imai, Odawara (JP); Hideaki Shiga, Odawara (JP); Akihisa Kusayanagi, Odawara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 125 days.

(21) Appl. No.: 10/652,250

(22) Filed: Sep. 2, 2003

(65) Prior Publication Data

US 2004/0047074 A1    Mar. 11, 2004

(30) Foreign Application Priority Data

Sep. 5, 2002  (JP) .............................. 2002-260062
Jan. 23, 2003  (JP) .............................. 2003-014826

(51) Int. Cl.
*G11B 23/03*        (2006.01)

(52) U.S. Cl. ...................................................... 360/133
(58) Field of Classification Search ................ 360/133; 369/291.1; 720/719, 725, 728
See application file for complete search history.

(56) References Cited

U.S. PATENT DOCUMENTS

| 4,945,530 A | * | 7/1990 | Sandell et al. .............. 360/133 |
| 5,199,593 A | * | 4/1993 | Kita ............................ 220/613 |
| 6,256,168 B1 | | 7/2001 | Hales et al. |

* cited by examiner

*Primary Examiner*—Robert S. Tupper
(74) *Attorney, Agent, or Firm*—Sughrue Mion, PLLC

(57) ABSTRACT

A disk cartridge comprising a flat housing and a recording disk medium. The flat housing is constructed of upper and lower metal shells, and the recording disk medium is rotatably enclosed within the housing. The housing is assembled by mechanically linking the circumferential edge portions of the upper and lower shells together.

6 Claims, 6 Drawing Sheets

DISK CARTRIDGE

BACKGROUND OF THE INVENTION

1. Field of the Invention

The present invention relates to a disk cartridge in which a recording disk medium is rotatably enclosed within a housing made up of upper and lower metal shells, and more particularly to the assembled structure of the housing.

2. Description of the Related Art

In mobile equipment such as digital cameras, etc., a very small disk cartridge, called "clik!™" such as that described in U.S. Pat. No. 6,256,168, is in use as a recording medium. This disk cartridge 1 is 50 mm in width, 55 mm in depth, and 1.95 mm in thickness, as schematically shown in FIG. 12. It has a housing, which is constructed of a resin frame 2, and upper and lower metal shells 3, 4 formed from a stainless steel sheet of 0.2 mm in thickness. Within the housing, there is rotatably enclosed a magnetic disk of diameter 1.8 inch (about 45.7 mm) which has a recording capacity of 40 MB. The housing is equipped with a U-shaped opening 6 through which a magnetic head is positioned over a recording surface of the magnetic disk, and a rotary shutter 7 that covers the U-shaped opening 6 when read and write operations are not performed. As illustrated in FIG. 12, the upper and lower shells 3, 4 are laser welded at 10 or more positions P with the upper and lower circumferential wall portions abutting each other.

The assembled structure of the housing in the above-described conventional disk cartridge, however, has the following problems: (1) an expensive, special machine such as a laser welding machine is required and the upper and lower shells need to be precisely positioned so they are not shifted from each other; (2) paper or sputter dust particles occur at the time of welding, adhere to a recording medium, and have an adverse influence on read and write operations, and also contaminate assembly space (which requires a class 100 to 1000 clean room); (3) in the case of welding the circumferential edges of upper and lower shells, at welded portions the circumferential edge of one shell is provided with tabs protruding slightly from the other shell, and consequently, at portions other than the welded portions there occur slight gaps between both circumferential edges and the problem of the occurrence of dust particles will arise; and (4) when disassembling the welded upper and lower shells for recycling or collection of classified refuse, the welded portions have to be destroyed and therefore the operation of disassembling them is time-consuming.

SUMMARY OF THE INVENTION

The present invention has been made in view of the circumstances described above. Accordingly, it is the object of the present invention to provide an assembled structure of upper and lower shells that solves all the problems mentioned above.

To achieve this end and in accordance with the present invention, there is provided a disk cartridge comprising a flat housing and a recording disk medium. The flat housing is constructed of upper and lower metal shells, and the recording disk medium is rotatably enclosed within the housing. The housing is assembled by mechanically linking the circumferential edge portions of the upper and lower shells together.

In a preferred form of the present invention, the circumferential edge portions of the upper and lower shells are joined mechanically by engagement between grooves and protrusions formed in the upper and lower shells.

In another preferred form of the present invention, the circumferential edge portions of the upper and lower shells are joined mechanically by caulking either the circumferential wall portion of the upper shell or the circumferential wall portion of the lower shell.

In still another preferred form of the present invention, the upper and lower shells are formed by folding back a single metal plate.

In a further preferred form of the present invention, one of the circumferential edge portions of the upper and lower shells has fastening tongues, while the other circumferential edge portion has recesses at positions corresponding to the fastening tongues. And the circumferential edge portions of the upper and lower shells are joined mechanically by bending the fastening tongues inserted in the recesses.

In a further preferred form of the present invention, one of the circumferential edge portions of the upper and lower shells has windows, while the other circumferential edge portion has locking pieces at positions corresponding to the windows. And the circumferential edge portions of the upper and lower shells are joined mechanically by elastically fitting the locking pieces in the windows.

Further, the circumferential edge portions of the upper and lower shells can be joined mechanically by combining some of the aforementioned fastening tongues, recesses, locking pieces, and windows, or by using an adhesion or hot melting method at the same time.

According to the present invention, the upper and lower metal shells of the disk cartridge housing are joined mechanically by caulking or the like, without welding. Therefore, an expensive specialized machine such as a laser welding machine is not required and the disk cartridge housing can be easily and precisely assembled. In addition, there is no possibility that paper or sputter dust particles, which can contaminate the assembly environment and have an adverse influence on read and write operations, will be generated during assembly. Furthermore, when disassembling the upper and lower shells for recycling or collection of classified refuse, the disassembly operation is easy.

BRIEF DESCRIPTION OF THE DRAWINGS

The present invention will be described in further detail with reference to the accompanying drawings wherein.

DESCRIPTION OF THE PREFERRED EMBODIMENTS

Embodiments of the present invention will hereinafter be described in detail with reference to the drawings. To facilitate understanding of the present invention, the dimensions of each part will be shown at ratios differing from those of the actual dimensions.

Figure 1A:
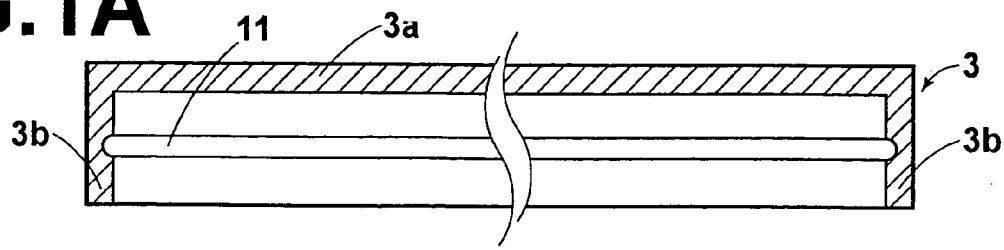
FIG. 1A is a schematic sectional view, partly omitted, showing the upper shell of a disk cartridge housing constructed in accordance with a first embodiment of the present invention.
Figure 1B:
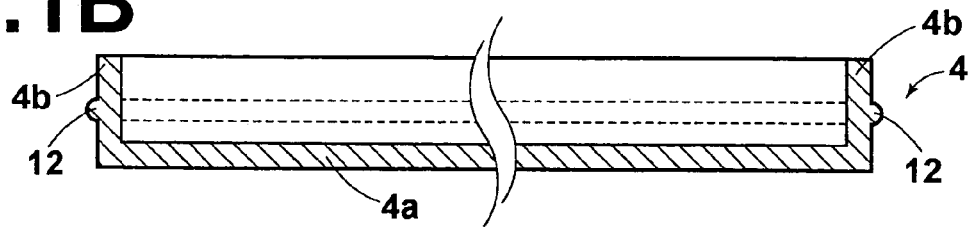
FIG. 1B is a schematic sectional view, partly omitted, showing the lower shell of the disk cartridge housing constructed in accordance with the first embodiment of the present invention.
Figure 1C:
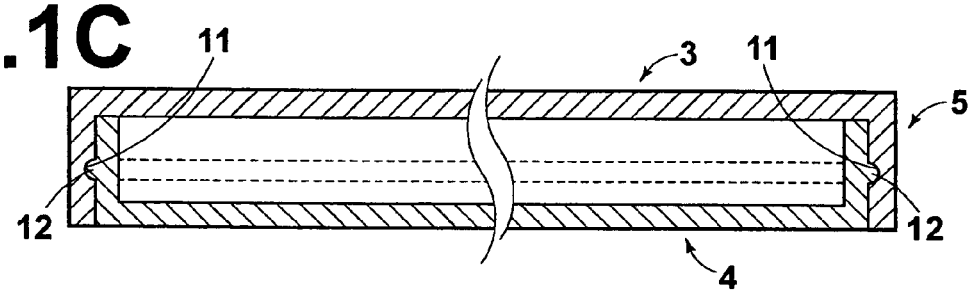
FIG. 1C is a schematic sectional view, partly omitted, showing the upper and lower shells joined together.

Referring now to FIGS. 1A to 1C, there is shown a disk cartridge housing 5 constructed in accordance with a first embodiment of the present invention.

An upper shell 3 illustrated in FIG. 1A consists of a flat plate portion 3a constituting the ceiling plate of the housing 5, and a circumferential wall portion 3b extending downwardly from the circumferential edge of the flat plate portion 3a. The interior wall surface of the circumferential wall portion 3b has a groove 11 extending parallel to the flat plate portion 3a.

A lower shell 4 illustrated in FIG. 1b consists of a flat plate portion 4a constituting the bottom plate of the housing 5, and a circumferential wall portion 4b extending upwardly from the circumferential edge of the flat plate portion 4a. The circumferential wall portion 4b is inserted inside the circumferential wall portion 3b of the upper shell 3, and the exterior wall surface has a ridge 12 engageable with the groove 11 and extending parallel to the flat plate portion 4a.

The above-described upper shell 3 and lower shell 4, as illustrated in FIG. 1C, are joined mechanically by the projection/groove engagement between the groove 11 and ridge 12, and constitute the housing 5. Preferably, the height of the ridge 12 from the exterior wall surface of the circumferential wall portion 4b is about 50% of the thickness of the circumferential wall portion 4b.

Figure 2A:
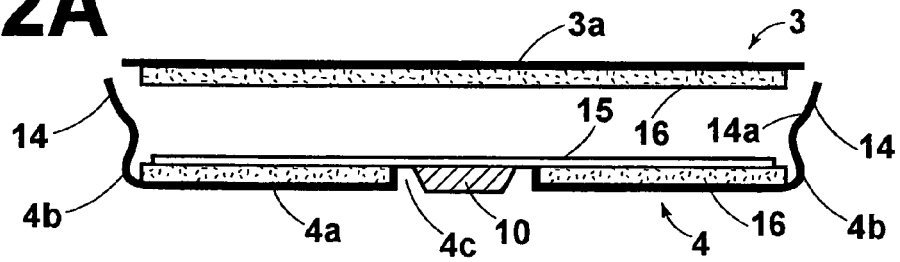
FIG. 2A is a sectional view showing a disk cartridge constructed in accordance with a second embodiment of the present invention.
Figure 2B:
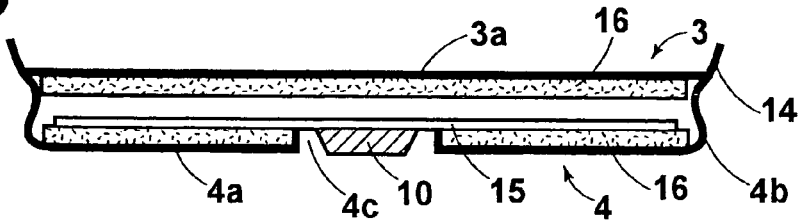
FIG. 2B is a sectional view showing the state in which an upper shell is placed on the step portion of a lower shell.
Figure 2C:
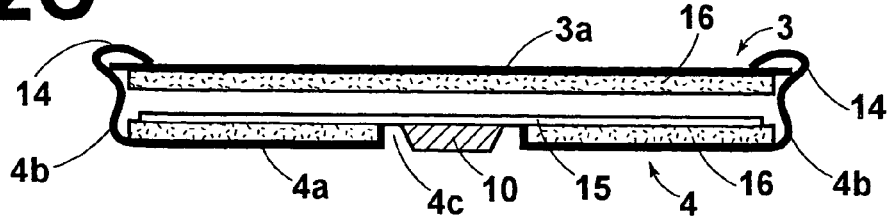
FIG. 2C is a sectional view showing the state in which the upper and lower shells are assembled into a housing by caulking.

Referring to FIGS. 2A to 2C, there is shown a disk cartridge constructed in accordance with a second embodiment of the present invention. This embodiment is characterized in that a housing 5 is assembled by caulking upper and lower shells 3, 4.

As illustrated in FIG. 2A, the upper shell 3 consists only of a flat metal plate 3a and has a discoid liner 16 adhesively attached on the under side of the flat metal plate 3a. The lower shell 4 is equipped with a circumferential wall portion 4b rising upwardly from the circumferential edge of a flat plate portion 4a. The upper portion of the circumferential wall portion 4a serves as a caulking portion 14, and the proximal portion of the caulking portion 14 has a step portion 14a that receives the circumferential edge of the upper shell 3 to regulate the spacing between the upper and lower shells 3, 4. Also, the flat plate portion 4a of the lower shell 4 has a drive spindle aperture 4c so a drive spindle (not shown) of a disk drive unit (not shown) can spin a magnetic disk 15 through a center core 10 mounted on the magnetic disk 15. The lower shell 4 further has a doughnut-shaped liner 16 adhesively attached on the upper side thereof, and the above-described magnetic disk 15 is placed on the doughnut-shaped liner 16.

As illustrated in FIG. 2B, the upper shell 3 is placed on the step portion 14a of the lower shell 4. And as illustrated in FIG. 2C, the caulking portion 14 is caulked to the circumferential edge portion of the upper plate portion 3a of the upper shell 3 by bending the caulking portion 14 inwardly, whereby the housing 5 is assembled.

Figure 3A:
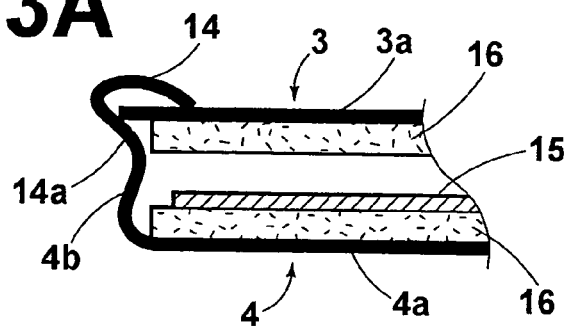
FIGS. 3A to 3C are enlarged sectional views showing different caulking portions by means of which upper and lower shells are mechanically joined.
Figure 3B:
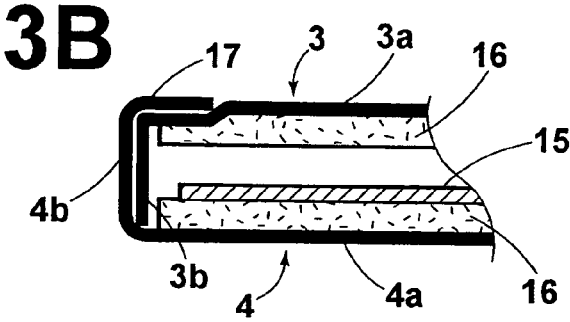
Figure 3C:
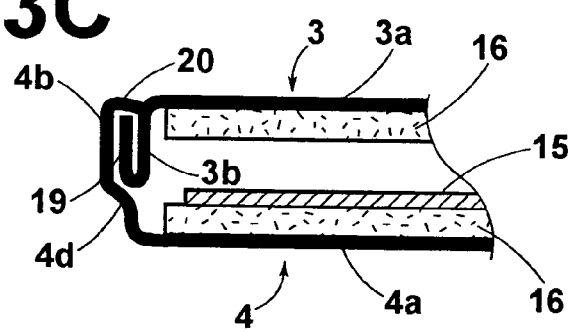

FIGS. 3A to 3C show different caulking portions by means of which upper and lower shells 3, 4 are mechanically joined. FIG. 3A shows an enlarged sectional view of the principal part of FIG. 2C.

In the case of FIG. 3B, the lower end of the circumferential wall portion 3b of the upper shell 3 abuts the upper side of the flat plate portion 4a of the lower shell 4 to regulate the spacing between the upper and lower shells 3, 4. The circumferential wall portion 4b of the lower shell 4 extends upwardly along the exterior wall of the circumferential wall portion 3b of the upper shell 3 and forms double walls, and the upper end portion of the circumferential wall portion 4b of the lower shell 4 is bent inwardly and caulked to the circumferential edge portion of the upper plate portion 3a of the upper shell 3, whereby the housing is assembled.

In the case of FIG. 3C, the lower portion of the circumferential wall portion 3b of the upper shell 3 is folded back outwardly and forms a folded-back portion 19. The circumferential wall portion 4b of the lower shell 4 has a step portion 4d, which receives the lower end of the folded-back portion 19 to regulate the spacing between the upper and lower shells 3, 4. And the upper end portion of the circumferential wall portion 4b of the lower shell 4 is bend inwardly as a caulking portion 20 and caulked onto the folded-back portion 19 of the upper shell 3, whereby the housing is assembled.

Figure 4:
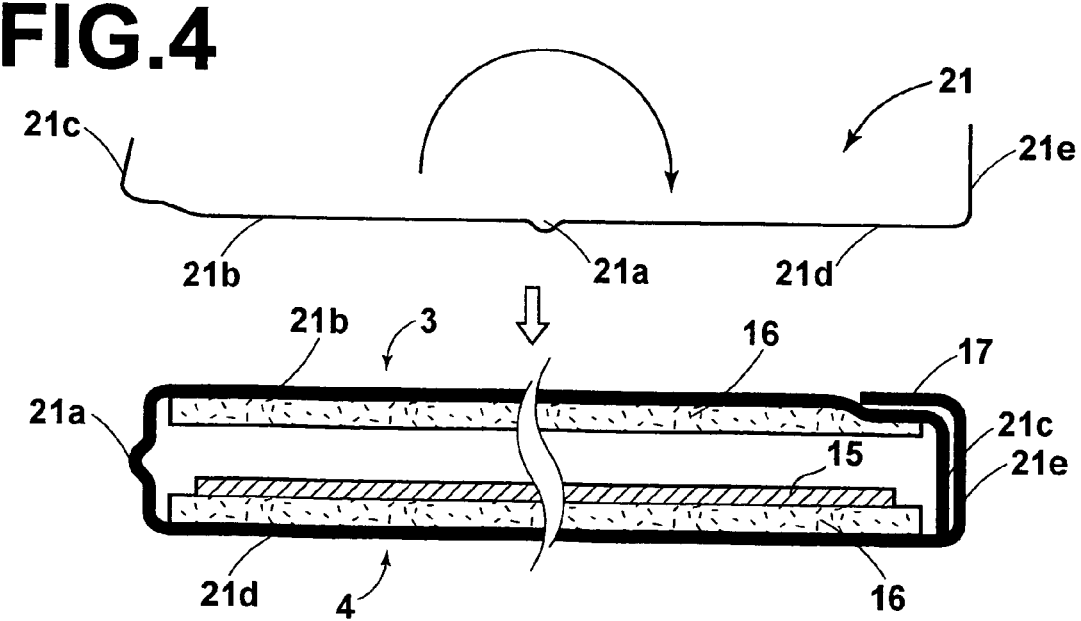
FIG. 4 is a sectional view showing a disk cartridge constructed in accordance with a third embodiment of the present invention.

Referring to FIG. 4, there is shown a disk cartridge constructed in accordance with a third embodiment of the present invention. This embodiment is characterized in that upper and lower shells 3, 4 are formed by folding and caulking a single metal plate 21. That is, at approximately the longitudinal center position of the metal plate 21, a protrusion 21a is formed so it extends perpendicular to the longitudinal direction of the metal plate 21, and by folding back the metal plate 21 along the protrusion 21a, the left-side plate portion 21b of the protrusion 21a forms the flat plate portion of the upper shell 3, while the right-side plate portion 21d of the protrusion 21a forms the flat plate portion of the lower shell 4. Also, the circumferential edge portion 21c of the left-side plate portion 21b is bent and formed into the circumferential wall portion of the upper shell 3. Similarly, the circumferential edge portion 21e of the right-side plate portion 21d is bent and formed into the circumferential wall portion of the lower shell 4. For example, the circumferential edge portions 21c, 21e are joined by bending a caulking portion 17 inwardly, as illustrated in FIG. 3B.

Figure 5:
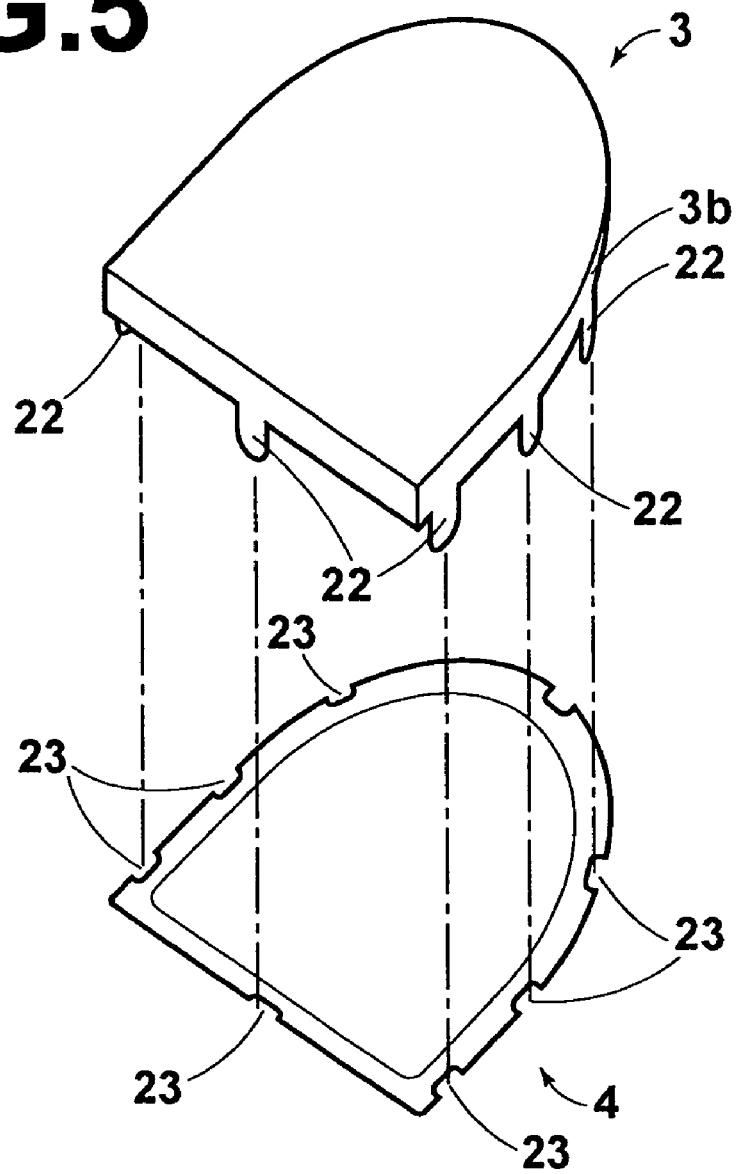
FIG. 5 is an exploded perspective view of a disk cartridge housing constructed in accordance with a fourth embodiment of the present invention.
Figure 6:
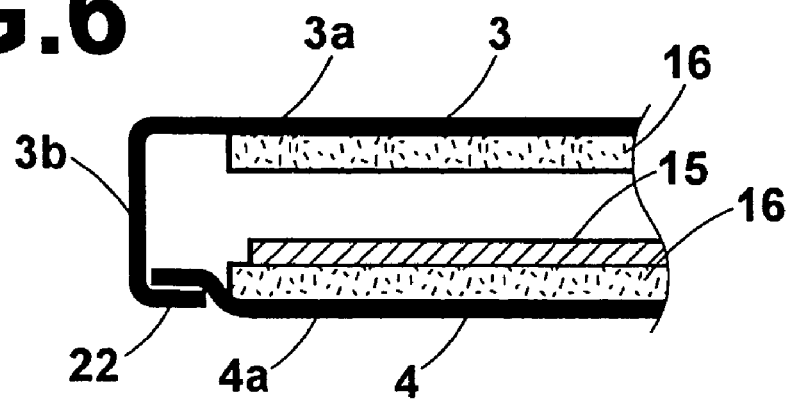
FIG. 6 is an enlarged sectional view showing the principal part of the disk cartridge housing of the fourth embodiment.

Referring to FIG. 5, there is shown a disk cartridge constructed in accordance with a fourth embodiment of the present invention. In this embodiment, the lower edge of the circumferential wall portion 3b of an upper shell 3 is provided with a plurality of fastening tongues 22, and the circumferential edge portion of the flat plate portion 4a of a lower shell 4 has a plurality of recesses 23 at the positions corresponding to the fastening tongues 22. After the fastening tongues 22 on the side of the upper shell 3 are inserted through the recesses 23 of the lower shell 4, the fastening tongues 22 projected downwardly from the under side of the flat plate portion of the lower shell 4 are bent inwardly as shown in FIG. 6, whereby the housing is assembled. Note that the fastening tongues 22 may be provided on the side of the lower shell 4 and the recesses 23 on the side of the upper shell 3.

Figure 7A:
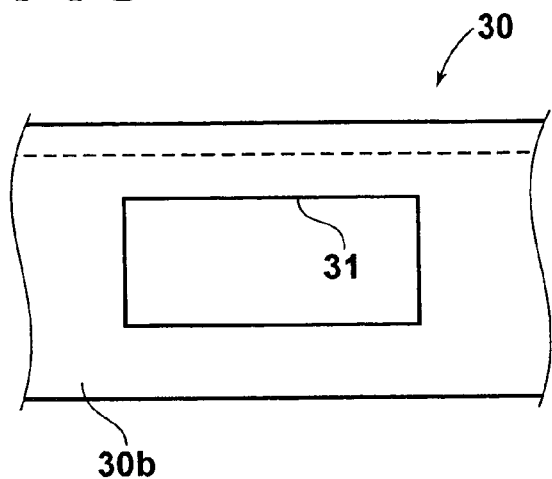
FIG. 7A is a front view showing the principal part of the upper shell of a disk cartridge housing constructed in accordance with a fifth embodiment of the present invention.
Figure 7B:
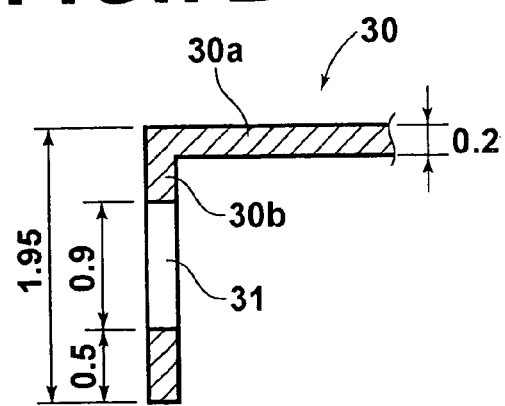
FIG. 7B is a sectional view showing the principal part of the upper shell of the disk cartridge housing constructed in accordance with the fifth embodiment.
Figure 8A:
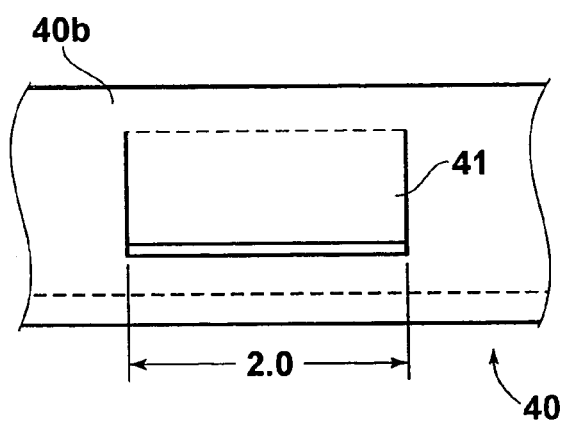
FIG. 8A is a front view showing the principal part of a lower shell that is joined to the upper shell of FIG. 7.
Figure 8B:
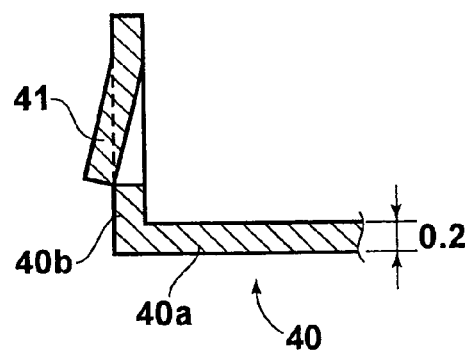
FIG. 8B is a sectional view of the principal part of the lower shell shown in FIG. 8A.
Figure 9A:
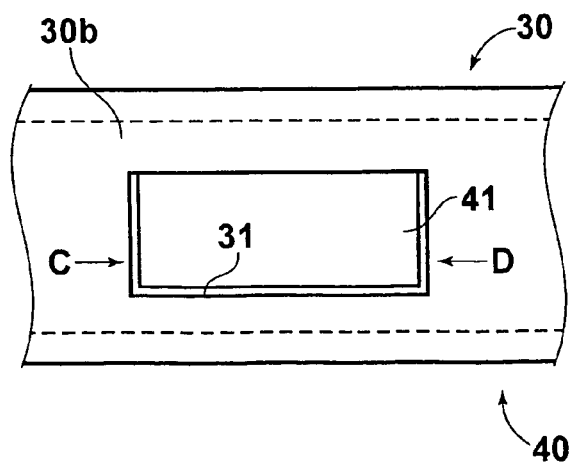
FIG. 9A is a front view showing the state in which the upper and lower shells of FIGS. 7 and 8 are mechanically joined.
Figure 9B:
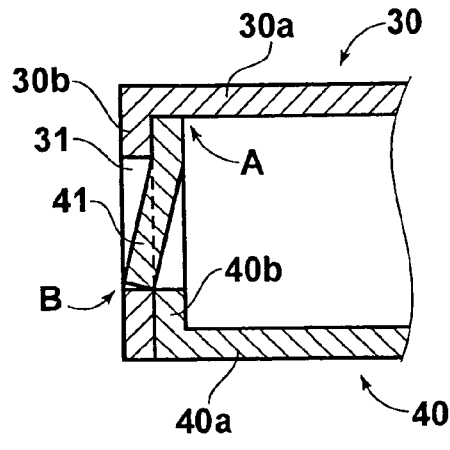
FIG. 9B is a sectional view showing the state in which the upper and lower shells of FIGS. 7 and 8 are mechanically joined.

Referring to FIGS. 7 to 9, there is shown a disk cartridge constructed in accordance with a fifth embodiment of the present invention. FIGS. 7A and 7B show front and sectional views of the principal part of the circumferential wall portion of the upper shell of the fifth embodiment, FIGS. 8A and 8B show front and sectional views of the principal part of the circumferential wall portion of the lower shell of the fifth embodiment, and FIGS. 9A and 9B show front and sectional views of the state in which the upper and lower shells are mechanically joined.

In FIGS. 7A and 7B, the flat plate portion 30a of the upper shell 30 of the fifth embodiment is formed from a SUS 304 steel sheet of thickness 0.2 mm, and the circumferential wall portion 30b of the upper shell 30 is formed by bending the circumferential edge portion of the flat plate portion 30a downwardly at a right angle. The circumferential wall portion 30b has a plurality of rectangular windows 31. In the fifth embodiment, the height of the circumferential wall portion 30b is 1.95 mm, and the longitudinal length of the window 31 is slightly longer than 2 mm and the transverse length is 0.9 mm. The lower edge of the window 31 extends parallel to the lower edge of the wall portion 30b at a position 0.5 mm away from the lower edge of the wall portion 30b.

In FIGS. 8A and 8B, the flat plate portion 40a of the lower shell 40 of the fifth embodiment is likewise formed from a SUS 304 steel sheet of thickness 0.2 mm, and the circumferential wall portion 40b of the lower shell 40 is formed by bending the circumferential edge portion of the flat plate portion 40a upwardly at a right angle, and is arranged inside the circumferential wall portion 30b of the upper shell 30. At the positions corresponding to the windows 31, there are provided locking pieces 41, which are rectangular in shape and 2.0 mm in width. The number of locking pieces 41 corresponds to the number of windows 31. Each of the locking pieces 41 has a lower edge and side edges cut away from the circumferential wall portion 40b of the lower shell 40, and the lower edge is projected outwardly from the circumferential wall portion 40b.

When the circumferential wall portion 40b of the lower shell 40 is inserted inside the circumferential wall portion 30b of the upper shell 30, the locking pieces 41 of the lower shell 40 are elastically bent inwardly by the lower edge portion of the circumferential wall portion 30b of the upper shell 30, and as soon as the top surface of the circumferential wall portion 40b of the lower shell 40 abuts the under side of the flat plate portion 30a of the upper shell 30, the locking pieces 41 restore to their original states and are fitted in the windows 31. As illustrated in FIGS. 9A and 9B, the upper and lower shells 30, 40 are mechanically joined at the circumferential wall portions 30b, 40b.

In the joined structure described above, even if force is applied so the upper and lower shells 30, 40 are further pushed, the top end of the circumferential wall portion 40b of the lower shell 40 abuts the under side of the flat plate portion 30a of the upper shell 30 at position A indicated in FIG. 9B, and consequently, it is impossible to push them any further. Also, even if force is applied so the upper and lower shells 30, 40 are vertically separated from each other, the lower edge of each of the fastening pieces 41 of the lower shell 40 abuts the lower edge of the corresponding window 31 of the upper shell 30 at position B indicated in FIG. 9B, so it is impossible to separate them.

Further, even when force is applied so that the circumferential wall portions 30b, 40b of the upper and lower shells 30, 40 are shifted horizontally from each other, the side edge of the locking piece 41 abuts the side edge of the window at position C or D indicated in FIG. 9A, so it is also impossible to shift the upper and lower shells 30, 40 horizontally.

However, if the locking pieces 41 are disengaged from the windows 31 by being bent inwardly, the upper and lower shells 30, 40 can be vertically separated.

Thus, although the joined structure of the upper and lower shells 30, 40 in the fifth embodiment is simple, the housing is extremely easy to assemble, and although the joined strength of the upper and lower shells 30, 40 is high, it is also possible to disassemble them.

Figure 10:
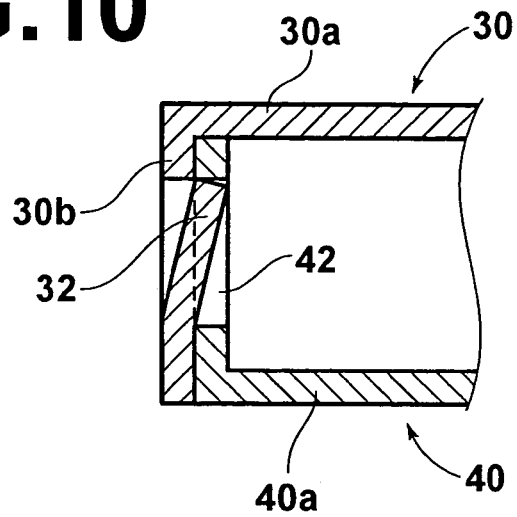
FIG. 10 is a sectional view showing an alteration of the joined structure of FIG. 9B.

Instead of the above-described structure, the circumferential wall portion 40b of the lower shell 40 may be provided with windows 42 and the circumferential wall portion 30b of the upper shell 30 may have locking pieces 32, as shown in FIG. 10. Similarly, the above-described advantages can be obtained.

Figure 11:
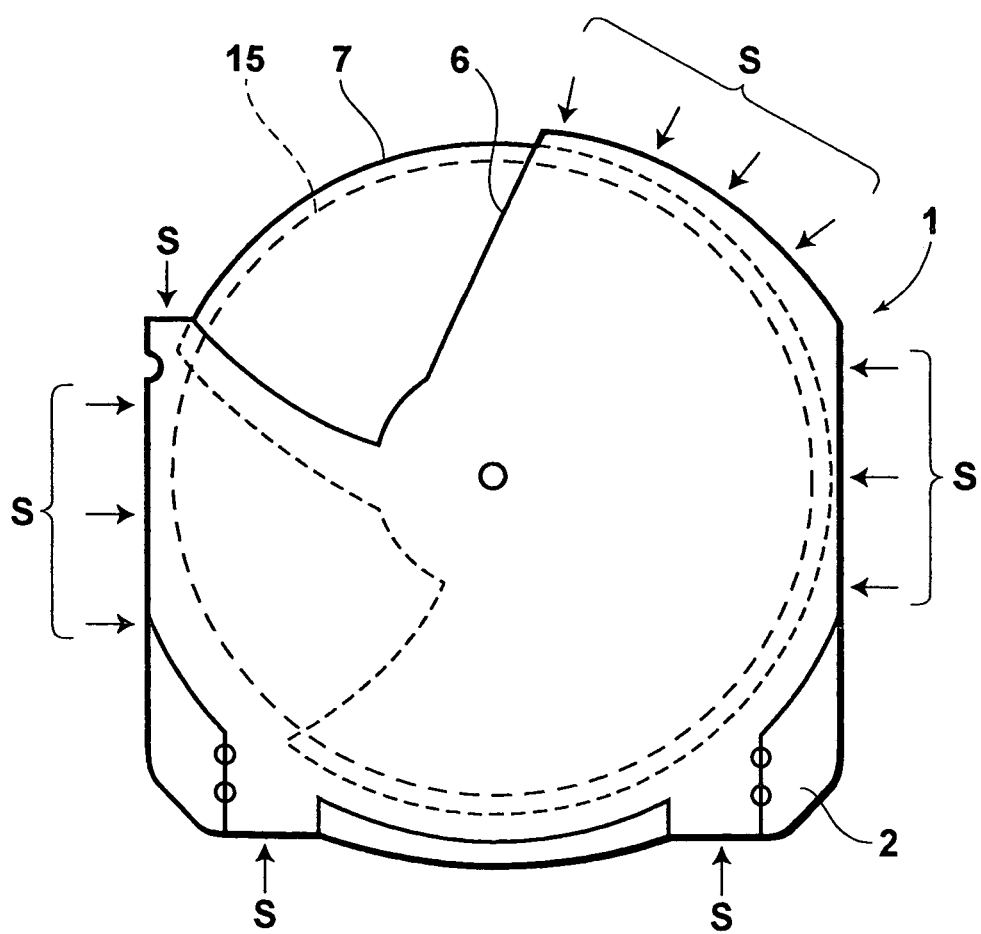
FIG. 11 is a plan view showing the joined portions of the upper and lower shells of a disk cartridge constructed in accordance with the fifth embodiment of the present invention.
Figure 12:
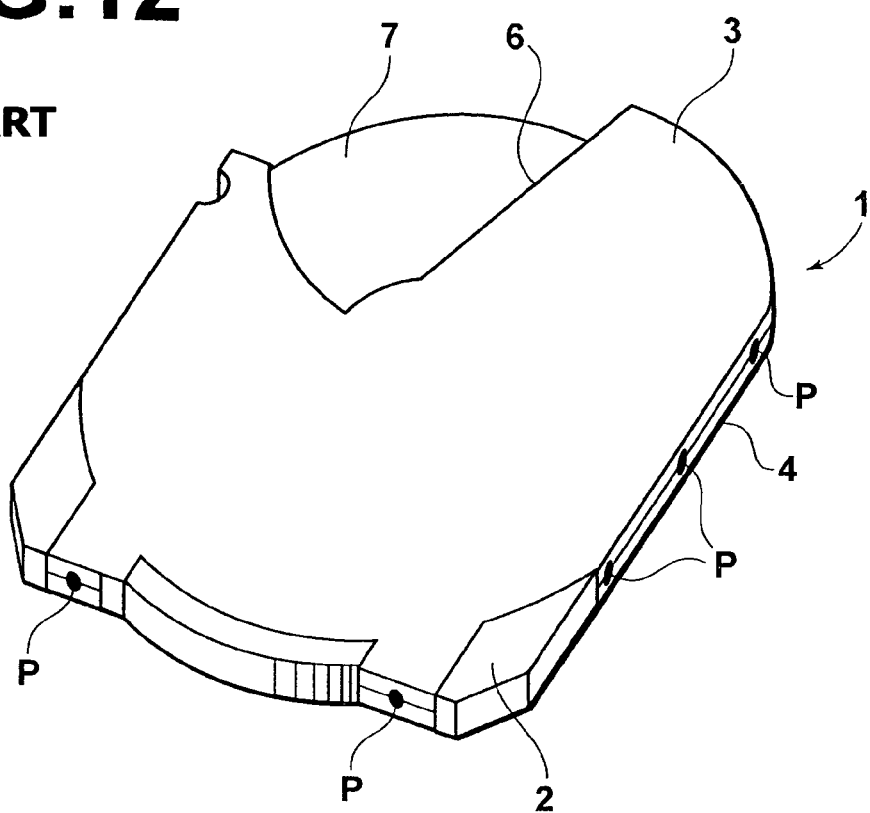
FIG. 12 is a perspective view showing a conventional disk cartridge.

FIG. 11 illustrates a plan view of the case where the joined structure of the upper and lower shells in FIGS. 9A and 9B is employed in the magnetic disk cartridge 1 described in FIG. 12, and the upper and lower shells are joined at 13 positions indicated by arrows S. Note in FIG. 11 that reference numeral 15 denotes a magnetic disk.

As evident in the foregoing description, the above-described embodiments are excellent in assembly characteristics and disassembly characteristics, do not contaminate the assembly environment, and have no adverse influence on read and write operations.

While the present invention has been described with reference to the preferred embodiments thereof, the invention is not to be limited to the details given herein, but may be modified within the scope of the invention hereinafter claimed.

What is claimed is:
1. A disk cartridge comprising:
  a flat housing constructed of upper and lower shells, said upper shell having a substantially horizontal ceiling plate and a substantially vertical wall portion connected to the ceiling plate at a peripheral edge of the ceiling plate, the substantially vertical wall portion of the upper shell having a substantially rectangular cross section along its height, and said lower shell having a substantially horizontal bottom plate, and a substan- tially vertical wall portion connected to the bottom plate at a peripheral edge of the bottom plate, the substantially vertical wall portion of the bottom plate having a substantially rectangular cross section along its height; and a recording disk medium rotatably enclosed within said housing;

wherein said housing is assembled by mechanical engagement between a side portion of the vertical wall portion of the upper shell and a side portion of the vertical wall portion of lower shell.

2. The disk cartridge as set forth in claim 1, wherein the vertical wall portions of said upper and lower shells are joined mechanically by engagement of grooves and protrusions formed in said upper and lower shells.

3. The disk cartridge as set forth in claim 2, wherein the grooves are disposed on the side portion of the vertical wall portion of the upper shell, wherein the side portion is an interior side of the vertical wall portion of the upper shell, and the protrusions are disposed on the side portion of the vertical wall portion of the lower shell, wherein the side portion is an exterior side of the vertical wall portion of the lower shell.

4. The disk cartridge as set forth in claim 3, wherein said protrusion extends from the exterior side of the vertical wall portion of the lower shell by a distance about equal to one-half of a thickness of the vertical wall portion of the lower shell.

5. The disk cartridge as set forth in claim 4, wherein an end portion of the vertical wall portion of the upper case is in substantially the same plane as an exterior side of the bottom plate.

6. The disk cartridge as set forth in claim 5, wherein said upper and lower shells are metal.

* * * * *